US006253260B1

United States Patent
Beardsley et al.

(10) Patent No.: US 6,253,260 B1
(45) Date of Patent: Jun. 26, 2001

(54) INPUT/OUTPUT DATA ACCESS REQUEST WITH ASSIGNED PRIORITY HANDLING

(75) Inventors: Brent Cameron Beardsley; James Lincoln Iskiyan, both of Tucson, AZ (US); Harry Morris Yudenfriend, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/176,632

(22) Filed: Oct. 22, 1998

(51) Int. Cl.[7] .............................. G06F 3/00; G06F 13/28; G06F 13/00; G06F 13/14
(52) U.S. Cl. ................................ 710/5; 710/5; 710/20; 710/39; 710/40; 710/44
(58) Field of Search .................... 710/5, 6, 20, 21, 710/39, 40, 43, 7, 9, 17, 27, 44; 709/103, 107; 711/112, 111, 118

(56) References Cited

U.S. PATENT DOCUMENTS

| | | | |
|---|---|---|---|
| 4,320,455 | * | 3/1982 | Woods et al. ......................... 710/200 |
| 4,553,203 | * | 11/1985 | Rau et al. ............................... 712/25 |
| 4,623,886 | * | 11/1986 | Livingston ......................... 340/825.5 |
| 4,901,232 | * | 2/1990 | Harrington et al. ...................... 710/6 |
| 4,939,644 | * | 7/1990 | Harrington et al. ...................... 710/5 |
| 5,038,346 | * | 8/1991 | Courtois ............................... 370/440 |
| 5,179,557 | * | 1/1993 | Kudo ................................... 370/94.1 |
| 5,220,653 | * | 6/1993 | Miro ...................................... 709/107 |
| 5,560,019 | * | 9/1996 | Narad ..................................... 710/260 |
| 5,940,612 | * | 8/1999 | Brady et al. .......................... 709/103 |

FOREIGN PATENT DOCUMENTS

88/06317 * 8/1988 (WO) .

* cited by examiner

Primary Examiner—Thomas Lee
Assistant Examiner—Chun Cao
(74) Attorney, Agent, or Firm—David W. Victor; Konrad Raynes & Victor

(57) ABSTRACT

Disclosed is a system and method for processing a data access request (DAR). A processing unit, such as a storage controller, receives a DAR, indicating data to return on a channel, such as a channel connecting to a host system, and priority information for the received DAR. The processing unit retrieves the requested data for the received DAR from a memory area, such as a cache or direct access storage device (DASD), and determines whether there is a queue of data entries indicating retrieved data for DARs to transfer on the channel. The queued DARs include priority information. The processing unit processes at least one data entry in the queue, the priority information for the data entry, and the priority information for the received DAR to determine a position in the queue for the received DAR. The processing unit then indicates that the received DAR is at the determined position in the queue and processes the queue to select retrieved data to transfer on the channel to the host system.

31 Claims, 5 Drawing Sheets

INPUT/OUTPUT DATA ACCESS REQUEST WITH ASSIGNED PRIORITY HANDLING

BACKGROUND OF THE INVENTION

1. Field of the Invention

The present invention relates to a method and system for queuing data access requests (DAR) according to a priority system.

2. Description of the Related Art

In current storage systems, a storage controller manages data transfer operations between a direct access storage device (DASD), which may be a string of hard disk drives or other non-volatile storage device(s), and host systems and their application programs. To execute a read operation presented from a host system, i.e., a data access request (DAR), the storage controller must physically access the data stored in tracks in the DASD. A DAR is a set of contiguous data sets, such as tracks, records, fixed blocks, or any other grouping of data. The process of physically rotating the disk in the DASD to the requested track then physically moving the reading unit to the disk section to read data is often a time consuming process. For this reason, current systems stage data into a cache memory of the storage controller in advance of the host requests for such data.

A storage controller typically includes a large buffer managed as a cache to buffer data accessed from the attached DASD. In this way, data access requests (DARs) can be serviced at electronic speeds directly from the cache thereby avoiding the electromechanical delays associated with reading the data from the DASD. Prior to receiving the actual DAR, the storage controller receives information on a sequence of tracks in the DASD involved in the upcoming read operation or that data is being accessed sequentially. The storage controller will then proceed to stage the sequential tracks into the cache. The storage controller would then process DARs by accessing the staged data in the cache. In this way, the storage controller can return cached data to a read request at the data transfer speed in the storage controller channels as opposed to non-cached data which is transferred at the speed of the DASD device.

A "hit" is a DAR that can be serviced from cache, whereas a "miss" occurs when the requested data is not in cache and must be retrieved from DASD. With the International Business Machines Corporation (IBM) 3990 Storage Controller, if a miss occurs, the storage controller disconnects from the channel and then accesses the DASD to retrieve the requested data. After retrieving the requested data from the DASD and storing the data in cache, the storage controller then reconnects to the channel and the requesting device, e.g., host, and returns the retrieved requested data. If there are multiple channel paths between a host and I/O device, then the storage controller can reconnect on any of the multiple channel paths to return the requested data to the I/O device. If retrieved data for multiple DARs are queued against a channel, then the storage controller typically uses a First-in-First-Out (FIFO) algorithm to determine which retrieved data request to return to the channel. Moreover, if there are multiple cache misses and multiple DARs are queued against a single I/O device or logical volume, then the storage controller typically uses a FIFO algorithm to execute queued DARs against the I/O device or logical volume. The servicing of DARs by a storage controller is described in IBM publication "Storage Subsystem Library: IBM 3990 Storage Control Reference (Models 1, 2, and 3)", IBM document no. GA32-0099-06, (IBM Copyright 1988, 1994), which publication is incorporated herein by reference in its entirety.

There is a need in the art for an improved method for processing DARs and returning DARs to a channel.

SUMMARY OF THE PREFERRED EMBODIMENTS

To provide improvements over the prior art, preferred embodiments disclose a system and method for processing a data access request (DAR). A processing unit receives a DAR, indicating data to return on a channel, and priority information for the received DAR. The processing unit retrieves the requested data for the received DAR from a memory area and determines whether there is a queue of data entries indicating retrieved data for DARs to transfer on the channel. The queued DAR data entries include priority information. The processing unit processes at least one data entry in the queue, the priority information for the data entry, and the priority information for the received DAR to determine a position in the queue for the received DAR. The processing unit then indicates that the received DAR is at the determined position in the queue and processes the queue to select retrieved data to transfer on the channel.

In further embodiments, the processing unit receives a DAR indicating a data request to return on a channel and information indicating a priority of the received DAR. The processing unit then determines an address in the memory area of the data to retrieve for the received DAR and processes a queue indicating multiple DARs queued against the address. Priority information is associated with the queued DARs. The processing unit processes at least one DAR entry indicated in the queue, the priority information for the DAR entry, and the priority information for the received DAR to determine a position in the queue for the received DAR. The processing unit then indicates that the received DAR is at the determined position in the queue, processes the queue to select a DAR, and accesses the second memory area to retrieve the requested data for the selected DAR.

Prior art systems return retrieved data to a channel and execute I/O requests according to FIFO and other methods that do not take into account the priority of the DARs. Preferred embodiments assign a priority to a DAR and then process the priority information when determining which DAR to return on a channel or execute against an address. Thus, preferred embodiments provide a system for processing DARs according to an assigned priority of the DAR. Further embodiments increment lower priority queued DARs when a higher priority DAR is added to the queue. This insures that lower priority DARs are not continually ignored as new entries are added to the queue.

BRIEF DESCRIPTION OF THE DRAWINGS

Referring now to the drawings in which like reference numbers represents corresponding parts thoughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Hardware and Software Environment

Figure 1:
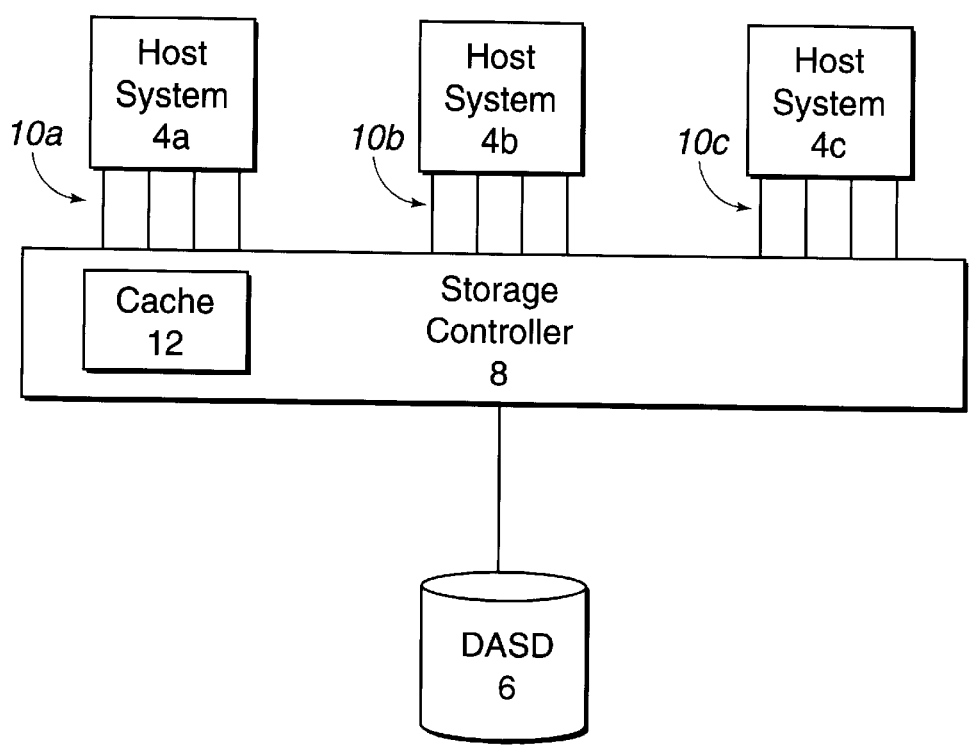
FIG. 1 illustrates a preferred hardware and software environment in which preferred embodiments of the present invention are implemented.

FIG. 1 illustrates a hardware environment in which preferred embodiments are implemented. A plurality of host systems 4a, b, c are in data communication with a DASD 6 via a storage controller 8. The host systems 4a, b, c may be any host system known in the art, such as a mainframe computer, workstations, etc., including an operating system such as ESA/390□, WINDOWS®, AIX®, UNIX®, MVS™, etc. AIX is a registered trademark of IBM; MVS and ESA/390 are trademarks of IBM; WINDOWS is a registered trademark of Microsoft Corporation; and UNIX is a registered trademark licensed by the X/Open Company LTD. In certain systems, the host system 4a, b, c may view the storage controller 8 as a multitude of separate control unit images or logical subsystems (LSSs), wherein each control unit image provides access to one or more logical volumes in the DASD 6 or I/O devices. The storage controller 8 may include multiple control unit images, i.e., LSSs, each of which may address up to 256 I/O devices.

In alternative embodiments, the DASD 6 may be comprised of any type of I/O device known in the art, e.g., magnetic-tape units, direct-access-storage devices (DASDs), displays, keyboards, communications controllers, teleprocessing devices, and sensor-based equipment. The DASD 6 may be comprised of separately addressable logical volumes. Alternatively, the storage controller 8 may control access to multiple I/O devices that may be separately addressable.

A plurality of channel paths 10a, b, c in the host systems 4a, b, c provide communication between the hosts 4a, b, c and DASD 6, via the storage controller 8. The physical elements that make up a channel path are a channel, possibly one or two dynamic switches, one or more storage controllers or control unit images (LSSs), and one or more links. The link comprises the physical communication and transmission medium between the host 4a, b, c and the storage controller 8. The link may be comprised of any transmission or medium protocol known in the art, such as LAN, TCP/IP, ESCON®, SAN, SNA, Fibre Channel, SCSI, etc. ESCON is a registered trademark of IBM. The structure and arrangement of the channel paths 10a, b, c that provide communication between the storage controller 8 and host 4a, b, c may have the structure of channel paths described in IBM publication "Enterprise Systems Architecture/390 ESCON I/O Interface," document no. SA22-7202-02 (Copyright IBM 1990, 1991, 1992), which publication is incorporated herein by reference in its entirety.

The host system 4a, b, c executes commands and receives data transmitted on a selected channel path 10a, b, c. The storage controller 8 issues commands to physically position the electromechanical devices to read the DASD 6. In preferred embodiments, the structure of the storage controller 8 and interface between the storage controller 8 and host systems 4a, b, c may include aspects of the IBM 3990 Storage Controller and the storage controller architecture described in the following U.S. patent applications assigned to IBM: "Failover System for a Multiprocessor Storage Controller," by Brent C. Beardsley, Matthew J. Kalos, Ronald R. Knowlden, U.S. Pat. No. 6,061,750, filed on Feb. 20, 1998; and "Failover and Failback System for a Direct Access Storage Device," by Brent C. Beardsley and Michael T. Benhase, U.S. Pat. No. 6,006,342, filed on Dec. 11, 1997, both of which applications are incorporated herein by reference in their entirety.

The storage controller 8 further includes a cache 12. In alternative embodiments, the cache 12 may be implemented in alternative storage areas accessible to the storage controller 8. In preferred embodiments, the cache 12 is implemented in a high speed, volatile storage area within the storage controller 8, such as a DRAM, RAM, etc. The length of time since the last use of a record in cache is maintained to determine the frequency of use of cache. Data can be transferred between the channels 10a, b, c and the cache 12, between the channels 10a, b, c and the DASD 6, and between the DASD 6 and the cache 12. In alternative embodiments with branching, data retrieved from the DASD 6 in response to a read miss can be concurrently transferred to both the channel 10a, b, c and the cache 12 and a data write can be concurrently transferred from the channel 10a, b, c to both a non-volatile storage unit and cache 12.

In certain embodiments, the channel paths 10a, b, c of communication between the storage controller 8 and the host systems 8 only allow one I/O request at time to be transmitted along a channel path 10a, b, c, such as is the case with SCON channels. Alternatively, the channel paths 10a, b, c may allow the concurrent communication of multiple DARs, such as is the case with Fibre Channel communication lines.

Information may be provided with a DAR indicating a priority of the DAR. The storage controller 8 would use the priority information to determine the order in which DARs are returned to the channel 10a, b, c. In preferred embodiments, the priority may be indicated in a command that precedes a DAR, such as a byte field in the Define Extent command used in the IBM mainframe environment to provide parameters on a data access request. The Define Extent command is described in the IBM publication, "IBM 3990/9390 Storage Control Reference," IBM Document no. GA32-0274-04 (Copyright IBM, 1994, 1996), which publication is incorporated herein by reference in its entirety. The priority indicator may be comprised of one byte, 00 to FF, which indicates 256 potential priority values for the DAR. For instance, a priority value of 00 may indicate no priority, 01 may indicate the lowest priority level and FF may indicate the highest possible priority for the DAR. The priority may be determined in any matter known in the art for determining priority for I/O requests.

In preferred embodiments where only one DAR can be transmitted on a channel path 10a, b, c at a time, the storage controller 8 uses the priority to determine how to process DARs when the storage controller 8 reconnects to a path. As discussed, when there is a cache miss, the storage controller 8 disconnects from the channel path 10a, b, c, allowing other DARs to be transmitted on the path, and then retrieves the requested data from the DASD 6. If there are multiple DARs retrieved from the DASD 6 for a channel path 10a, b, c, then the storage controller 8 must queue the DARs when reconnecting to the channel path 10a, b, c. In preferred embodiments, the storage controller 8 returns retrieved data for queued DARs to the hosts 4a, b, c according to the priority indicated in the priority field when there are multiple queued DARs to return to the channel path 10a, b, c upon reconnection. For instance, in the IBM ESCON 3990 storage controller environment, the priority field is processed when the storage controller 8 executes the Channel Command Retry to reconnect to the channel path 10a, b, c and return the DAR.

A return queue provides a list of retrieved DARs that are to be returned along the same channel path 10a, b, c. A return queue may be maintained for each channel path 10a, b, c that has multiple DARs backed up to reconnect to the path. A device queue may include DARs to be executed against the same volume (I/O device). The return and device queues may be a doubly linked list data structure. Each list may include an anchor to the top of the list, which is the DAR having the highest priority and a pointer to the bottom of the list. In preferred embodiments, the entries in the queue are ordered hierarchicaclly, with the highest priority entry at the top and lowest priority entry at the bottom. Each entry in the doubly linked list includes a pointer to the entry above, i.e., closer to the highest priority end, referred to herein as an "up pointer" and a pointer to the entry below, i.e., closer to the lowest priority entry, referred to herein as a "down pointer." The return and device queues may be implemented as a doubly linked list of pointers to the data in cache 12. Alternatively, the queues may be implemented in control blocks allocated in cache 12, wherein each track or data set has a corresponding control block in the control block section of cache 12. If a track or data set in cache 12 was in the list, then the control block for such track would include fields indicating for the data entry in cache 12 the "up pointer" and "down pointer," including the data entry. Another control block could maintain the anchor information to access the beginning and end of the list. In preferred embodiments, the upper end of the queue has the highest priority retrieved data as indicated by the priority data.

The entries in the queue may be pointers to actual data, such as the DARs and/or the retrieved data for the DARs. Alternatively, the entries in the queue may include the actual DARs and/or retrieved data for the DARs.

Processing DARs Using the Priority Field

Figure 2:
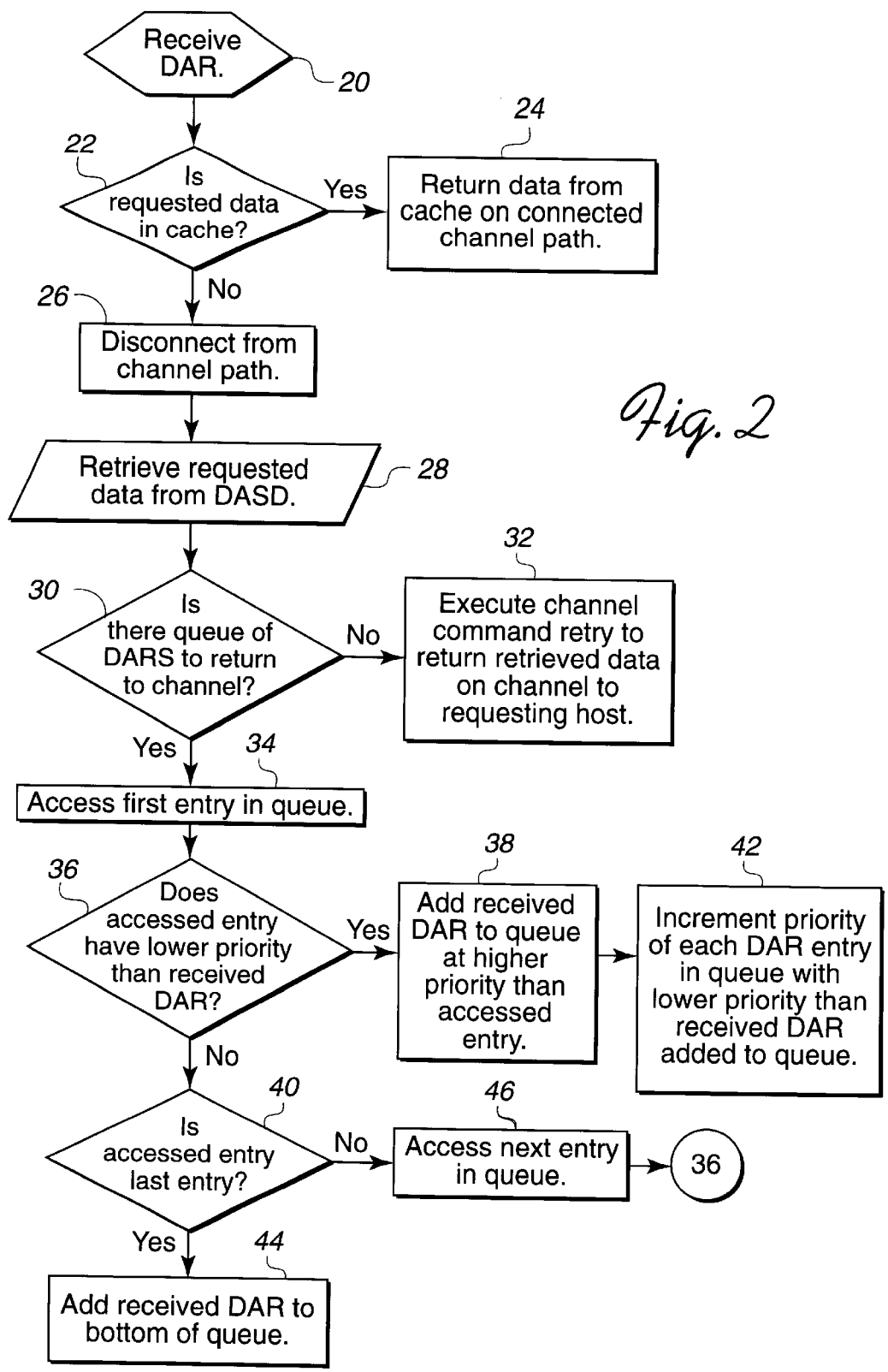
FIG. 2 illustrates preferred logic to process a data access request (DAR) in accordance with preferred embodiments of the present invention.

FIG. 2 illustrates logic implemented in the storage controller 8 to process DARs received from a host system 4a, b, c. Control begins at block 20 which represents the storage controller 8 receiving a DAR from a host system 4a, b, c. Control transfers to block 22 which represents the storage controller 8 determining whether the requested data is in cache 12. If so, control transfers to block 24 to transfer the requested data from cache 12 to the channel on which the DAR was received to the requesting host 4a, b, c. If there is a cache miss, then control transfers to block 26 which represents the storage controller 8 disconnecting from the channel path 10a, b, c on which the DAR was received. Control then transfers to block 28 which represents the storage controller 8 retrieving the requested data from DASD 6. After retrieving the data from the DASD 6, the storage controller 8 may place the retrieved data in cache 12. Control then transfers to block 30 where the storage controller 8 determines whether there is a return queue of DARs for the channel path 10a, b, c on which the retrieved data is to be returned. If there is not a return queue of retrieved data, then control transfers to block 32 which represents the storage controller 8 executing a channel command retry to reconnect to the channel and return the retrieved data to the requesting host 4a, b, c. Otherwise, control transfers to block 34 where the storage controller 8 accesses the first entry in the return queue of retrieved DARs for the channel path 10a, b, c on which the retrieved data for the received DAR is to be returned.

At block 36, the storage controller 8 compares the priority for the received DARs with the priority of the accessed data entry. If the accessed entry has a lower priority than the received DAR, then control transfers to block 38 which represents the storage controller 8 adding the retrieved data for the received DAR to the return queue directly above the entry with the lower priority; otherwise, control transfers to block 40. From block 38, control transfers to block 42 where the storage controller 18 increments the priority of the DARs in the queue that have lower priority than the received DAR added to the queue. This prevents lower priority DARs from being locked out by higher priority DARs added to the list. In this way, the lower priority DAR will eventually be returned to the requesting host even if higher priority DARs are continually added to the queue.

If the accessed entry has higher priority than the retrieved data for the received DAR being added to the return queue, then control transfers to block 40 where the storage controller 8 determines whether the accessed entry is the last entry. If so, control transfers to block 44 where the storage controller 8 adds the received DAR to the bottom of the queue; otherwise, control transfers to block 46 to access the next entry in the queue and proceed back to block 36 et seq. to locate the position where to place the retrieved data in the queue. Whenever retrieved data for a DAR is added to the queue, the "up" and "down" pointers of the adjacent entries are modified to point to the added entry and the pointers of the added retrieved data are modified to point to the adjacent entries. In preferred embodiments, the storage controller 8 selects entries to process from the top of the queue. In further embodiments, entries may be queued in alternative orders.

In preferred embodiments, whenever the storage controller 8 reconnects to the channel path 10a, b, c, the storage controller 8 processes the return queue to determine which DAR to transfer on the channel path 10a, b, c. An accessed DAR transferred on the channel path 10a, b, c to the requesting host is then removed from the queue. With the logic of FIG. 2, the storage controller 8 prioritizes which retrieved data is returned to the host 4a, b, c on the channel 10a, b, c upon reconnection. This ensures that data requested from higher priority applications are serviced prior to data requested as part of a lower priority DAR. The logic of FIG. 2 may be utilized in systems where data from only one DAR at a time can be transferred across a channel path 10a, b, c. In this way, the queue is utilized to select data to transfer across the channel path 10a, b, c to the requesting host 4a, b, c.

Figure 3A:
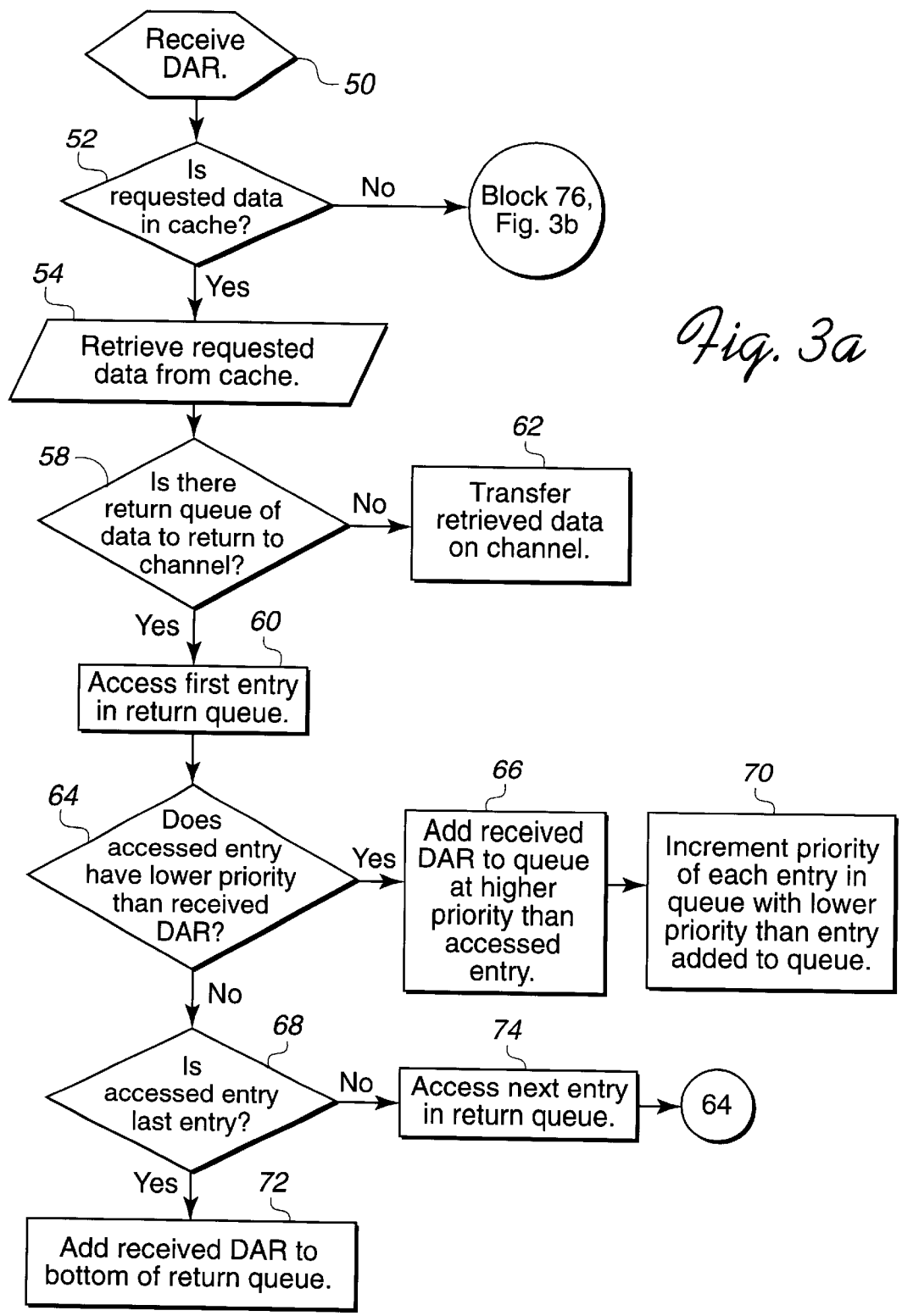
FIGS. 3a, b illustrate preferred logic to process a data access request (DAR) in accordance with preferred embodiments of the present invention.

FIGS. 3a, b illustrate logic implemented in a storage controller 8 to process a DAR from a channel path 10a, b, c that can handle multiple DAR transfers, such as the case with Fibre Channel. The logic of FIG. 3 utilizes two sets of queues. One set of queues, the return queue, is used to determine which retrieved data for DARs to transfer across the channel path 10a, b, c. A return queue may be maintained for each channel path 10a, b, c. The other queue, the device queue, is used to select data for a DAR to retrieve from DASD 6 or the I/O device when there are multiple DARs queued against an addressable location of the DASD 6. There may be a device queue for each addressable location against which DARs are executed.

Control begins at block 50 which represents the storage controller 8 receiving a DAR. Control transfers to block 52 which represents the storage controller 8 determining whether the requested data for the DAR is in cache 12. If so, control transfers to block 54; otherwise, control transfers to block 76 in FIG. 3b. At block 54, the storage controller 8 retrieves the requested data from cache 12. Control then transfers to block 58 which represents the storage controller 8 determining whether there is a return queue of data to transfer on the channel 10a, b, c on which the data retrieved at block 54 will be transferred. If so, control transfers to block 60; otherwise, control transfers to block 62 which represents the storage controller 8 transferring the retrieved data across the channel 10a, b, c to the requesting host 4a, b, c. At block 60, the storage controller 8 accesses the first entry of retrieved data in the return queue. Control then transfers to block 64 where the storage controller 8 compares the priority for the received DAR with the priority of the accessed DAR entry. If the accessed entry has lower priority, then control transfers to block 66 which represents the storage controller 8 adding the retrieved data for the received DAR to the queue directly above the entry with the lower priority; otherwise, control transfers to block 68. From block 66, control transfers to block 70 where the storage controller 18 increments the priority of each entry in the return queue that has lower priority than the data added to the queue. This prevents lower priority DARs from being locked out by higher priority DARs added to the list. In this way, the lower priority DAR will eventually be returned to the requesting host even if higher priority data retrievals are added to the return queue.

If the accessed entry has higher priority than the retrieved data being added to the return queue, then control transfers to block 68 where the storage controller 8 determines whether the accessed entry is the last entry. If so, control transfers to block 72 where the storage controller 8 adds the received DAR to the bottom of the return queue; otherwise, control transfers to block 74 to access the next entry in the return queue and proceed back to block 68 et seq. to locate the position where to place the just retrieved data into the return queue.

If, at block 52, the storage controller 8 determined that the requested data is not in cache 12, then control transfers to block 76 which represents the storage controller 8 determining whether there is a device queue including a plurality of DARs to execute against a particular addressable location, such as a logical volume or actual I/O device. If there is such a device queue, then control transfers to block 78; otherwise control transfers to block 80 to retrieve the requested data for the received DAR from the DASD 6, and then to block 58 et seq. in FIG. 3a to transfer the retrieved data across the channel 10a, b, c. If there is a device queue, then at block 78, the storage controller 8 accesses the first entry in the device queue. Control then proceeds to block 82 where the storage controller 8 compares the priority for the DAR being processed with the priority of the accessed queued DAR. If the accessed entry has higher priority than the DAR, then control transfers to block 84 which represents the storage controller 8 adding the DAR in the device queue directly above the queued DAR with the lower priority; otherwise, control transfers to block 86. From block 84, control transfers to block 88 where the storage controller 18 increments the priority of each entry in the queue that has lower priority than the data added to the queue. This prevents lower priority DARs from being locked out by higher priority DARs added to the list. In this way, the lower priority DAR will eventually be returned to the requesting host even if higher priority data retrievals are added to the queue.

If the accessed entry has higher priority than the retrieved data for the received DAR being added to the device queue, then control transfers to block 86 where the storage controller 8 determines whether the accessed entry is the last entry. If so, control transfers to block 90 where the storage controller 8 adds the received DAR to the bottom of the device queue; otherwise, control transfers to block 92 to access the next entry in the device queue and proceed back to block 82 et seq. to locate the position where to place the just retrieved data into the device queue.

In this way, when multiple I/Os can be transferred across a channel 10a, b, c, the storage controller 8 would use the return queue to determine which retrieved DARs to transfer across a channel path 10a, b, c based on a priority ordering. Further, the device queue is used to determine which DAR to execute against the DASD 6 (I/O device) when there are multiple DARs queued against the same address in the DASD 6.

When the storage controller 8 accesses the device queue to determine a DAR to process, then the storage controller 8 would proceed to blocks 58 et seq. to add the retrieved data to the return queue if necessary. In this way, the return queue is used to queue data and transfer data to the channel regardless of whether the data for the DAR is retrieved from cache 12 or DASD 6. In preferred embodiments, the storage controller 8 would access the return queue for a particular channel whenever the storage controller 8 reconnects, i.e., executes a Channel Command Retry, to return data on the channel.

Parallel Access Volumes

Figure 4:
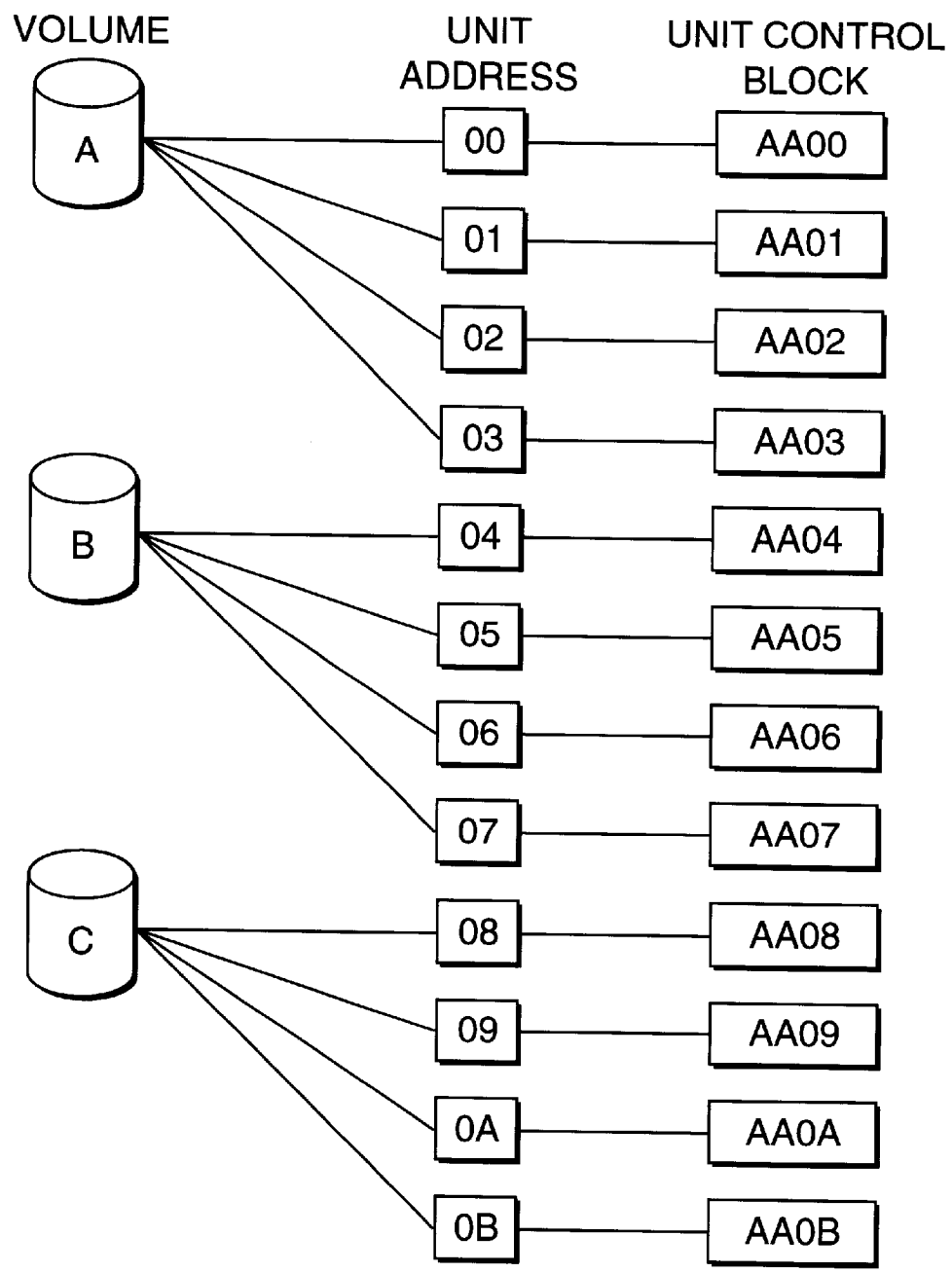
FIG. 4 illustrates how multiple addresses can relate to a single volume in accordance with preferred embodiments of the present invention.

FIG. 4 illustrates how a base and multiple alias addresses provide multiple addresses to volumes of a storage device, such as DASD 6. For each base and alias address, there is a corresponding unit address control block (UCB) and unit address. The UCB maintains control information the host system 4a, b, c uses to address the volume (device) addressed by the unit of the address. One of the unit addresses is for the base address and the other three are the alias addresses. A volume may be addressed with either the base or alias addresses associated with the volume. For instance, with reference to FIG. 4, volume A may be addressed using base unit address 00 and base UCB AA00, and alias unit addresses 01, 02, 03 and alias UCBs AA01, AA02, AA03. A UCB is maintained for each alias address and base address assigned to a volume. The host 4a, b, c accesses the UCBs to determine the status of the volumes. The UCBs in turn provide the unit address information needed for the I/O operation.

In preferred embodiments, every channel path 10a, b, c from the host 4a, b, c provides a unique path to a volume (I/O device). An I/O operation or chain of commands can be simultaneously executed toward the same volume using different base and alias unit addresses for the volume. An I/O operation may be executed as a series of linked channel command words (CCW). The CCW designates the storage area associated with the operation, the action to be taken whenever transfer to or from the area is completed, and other options. A CCW command includes different fields, including: a command code that specifies the operation to be performed, e.g., write, read, read backward, control, sense, sense ID, and transfer in channel; and an address field designating a location in absolute storage, otherwise referred to as a data storage address of where the I/O operations and commands are maintained in main memory, and chain command information specifying whether commands are chained together. With each chain of commands, a Define Extent command may be provided indicating the permissible I/O operations that may be performed and a locate record command indicating the actual I/O operation to be performed. The chain of CCW commands may operate within the defined extent range. A description of these commands is provided in the IBM publication, "IBM 3990/9390 Storage Control Reference," IBM Document no. GA32-0274-04 (Copyright IBM, 1994, 1996), which publication is incorporated herein by reference in its entirety.

In this way, the executed CCW commands are all directed toward the same DASD 6 or I/O device using different addresses, wherein each address uses one of multiple channel paths 10a, b, c to reach a particular volume in the DASD or an I/O device. This allows a single host 4a, b, c to concurrently execute multiple I/O operations against a single volume. The number of aliases provided for a base should be set according to the size of the volume and the number of concurrent users. In certain cases, only a few aliases may be needed to accommodate network traffic for a particular base address for an I/O device.

A host 4a, b, c first attempts to access a volume (I/O device) through the base UCB for the volume. If the base UCB is unavailable, i.e., busy servicing another I/O operation, then the host 4a, b, c may use one of the available alias UCBs to concurrently access the DASD 6 volume. When data is returned to the host system 4a, b, c, the host 4a, b, c can determine the DASD 6 volume from which the return data came from the address. Thus, if multiple I/O operations are directed toward a single volume (I/O device) concurrently along different channels using different UCBs, the host system 4a, b, c can handle multiple returns from the I/O operations because there are multiple UCBs associated with a volume and, hence, multiple ways to associate the host 4a, b, c and a logical volume. Further details of using base and alias addresses to access a logical volume or I/O device are described in related IBM patent applications: "Method And System For Dynamically Assigning Addresses To An Input/Output Device," by Brent C. Beardsley, Allan S. Merritt, Michael A. Paulsen, and Harry M. Yudenfriend, U.S. application Ser. No. 09/167,782, and "System For Accessing An Input/Output Device Using Multiple Addresses," by Brent C. Beardsley, James L. Iskiyan, James McIlvain, Phillip R. Mills, Michael A. Paulsen, William G. Thompson, Harry M. Yudenfriend, U.S application Ser. No. 09/168,017, which patent applications are assigned to IBM and which are incorporated herein by reference in its entirety.

Figure 3B:
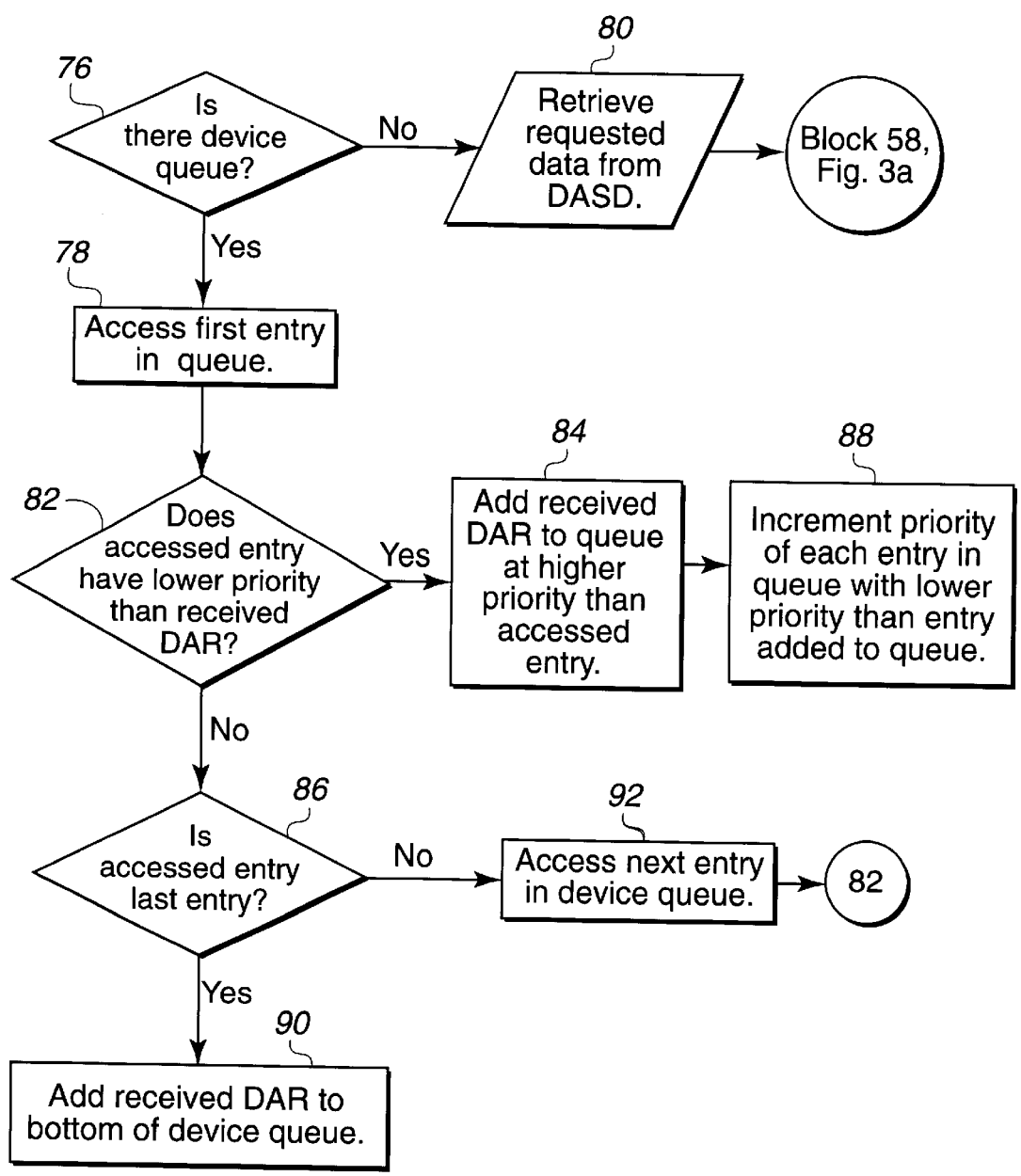

The logic of FIGS. 2, 3a, 3b may be utilized in a system in which a logical volume or I/O device may have concurrent I/O operations executing using base and alias addresses. In this way, the return and device queues could have multiple DARs directed toward the same logical volume (I/O device) from the same host 4a, b, c. Alternatively, the return or device queue could have multiple DARs directed toward the same logical volume (I/O device) from different hosts 4a, b, c. Multiple DARs queued and executed from different hosts 4a, b, c against the same logical volume may occur even if a logical volume may only be accessed through a base address, e.g., there are no alias addresses. Multiple I/O operations can be executed concurrently against the same device independent of whether the host system is capable of using both base and alias addresses. Different hosts can use the same base address to access a logical volume (I/O device).

Multiple hosts are able to use the same address to concurrently access a volume (I/O device) because each host provides unique host identification information with the target address of the I/O operation. In this way, any returns or attention messages resulting from the I/O operation will be routed to the host as identified in the target address. For instance, a target address for an I/O operation may include a first part consisting of the host or CPU address and a second part comprising the unit address of the volume (I/O device). This host address/ID information distinguishes the I/O operation to the storage controller 8 and requesting device, i.e., host or CPU. Because different hosts or CPUs within a host are not aware of the I/O operations being executed by other hosts or CPUs, different hosts can execute multiple I/Os using the same base address to a SAV volume or base or alias address to a PAV volume. However, a data integrity issue may arise if two hosts are writing to the same track at the same time or if a host is reading from a data set to which another host is writing.

If the storage controller 8 receives I/O requests on base and alias addresses toward a logical volume (I/O device), then, in preferred embodiments, the storage controller 8 executes DARs using alias addresses against the base address for the logical volume to access. The device queue would, thus, be maintained for all I/Os executed against a particular base address. Executing I/Os against a device or logical volume is described in related IBM patent application "Input/Output Operation Request Handling in a Multi-Host System," by Brent C. Beardsley, Joseph C. Elliot, and James L. Iskiyan, U.S. application Ser. No. 09/167,860, which patent application is assigned to IBM and which is incorporated herein by reference in its entirety.

Alternative Embodiments and Conclusions

This concludes the description of the preferred embodiments of the invention. The following describes some alternative embodiments for accomplishing the present invention. Of course, those skilled in the art will recognize many modifications may be made to this configuration without departing from the scope of the present invention.

Preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Moreover, the media may be in a transmittable format in route through a transmission line from one location to another.

Preferred embodiments were described as implemented in a mainframe operating system, such as the IBM S/390 system, and the IBM 3990 Storage Controller where read/write operations utilize commands such as the define extent command, locate record command, and chain of CCW commands. However, those skilled in the art will appreciate that the use of base and alias addressing to direct I/O operations concurrently to the same volume could apply to any data transfer interface known in the art, including SCSI, ST-506/ST-412, IDE/ATA, Enhanced Small Device Interface (ESDI), floppy disk, parallel port, ATA, EIDE, ATA-2, Fast ATA, Ultra ATA, etc.

The hosts 4a, b, c may be any central electronic complex (CEC) system known in the art including multiple CPUs executing simultaneous operations. The CEC may include one or more operating systems. Thus, one CEC host can appear to operate as several host systems. Each operating system in a single CEC would have its own addressing, thereby making the CEC appear as multiple hosts in a single machine. In preferred embodiments, channels from the CEC are ESCON channels connecting to the storage controller 8.

Preferred embodiments described a storage controller that communicates with a host system. However, in alternative embodiments the storage controller and host system may be any processing units or systems operating under microprocessor control.

The logic of FIGS. 2, 3a, b may be implemented in microcode accessible to the storage controller 8 or as part of an application the storage controller 8 executes. Still further, the logic of FIGS. 2, 3*a, b* may be executed in hardwired circuitry dedicated to managing the cache 12. Alternatively, certain of the logic of FIGS. 2, 3*a, b* may be performed by the host system 4*a, b, c*. The logic of FIGS. 2, 3*a, b* is for illustrative purposes. Certain steps may be modified or removed altogether and other steps added. Further, the order of the steps performed may also vary from the described embodiments.

In preferred embodiments, the lists were described as implemented as doubly linked list data structures comprised of lists or control blocks. Those skilled in the art will appreciate that alternative data structures may be utilized to implement the lists.

Preferred embodiments were described with respect to initially attempting to access a cache to service a DAR, wherein the cache buffers data from a DASD. The logic of the preferred embodiments could be used whenever data is buffered from any type of memory device, non-volatile as well as volatile, to another cache memory, which may be of a higher speed providing faster access. For instance, data from a DRAM or RAM can be buffered in a higher speed cache, such as a cache that is on-board a microprocessor, e.g., the L2 cache used with the PENTIUM II microprocessor. PENTIUM II is a registered trademark of Intel Corporation.

Preferred logic was described as retrieving data from a DASD 6. However, in alternative embodiments, the DARs may be issued against any type of I/O device. Thus, the preferred embodiments may apply to any type of I/O device against which I/O requests are queued. If the preferred embodiments are used to access data from an I/O device instead of a DASD, then the addressable devices against which the DARs are made would not be logical volumes of a DASD, but would instead by the I/O device that is the subject of the DAR.

In summary, preferred embodiments in accordance with the present invention provide a system and method for processing a data access request (DAR). A processing unit receives a DAR, indicating data to return on a channel, and priority information for the received DAR. The processing unit retrieves the requested data for the received DAR from a memory area and determines whether there is a queue of data entries indicating retrieved data for DARs to transfer on the channel. The queued DARs include priority information. The processing unit processes at least one data entry in the queue, the priority information for the data entry, and the priority information for the received DAR to determine a position in the queue for the received DAR. The processing unit then indicates that the received DAR is at the determined position in the queue and processes the queue to select retrieved data to transfer on the channel.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing a data access request (DAR), comprising the steps of:

receiving a DAR, wherein the data requested for the DAR is to be returned on a channel;

receiving information indicating a priority of the received DAR;

retrieving requested data for the received DAR from a memory area;

determining whether there is a queue of data entries indicating retrieved data for DARs to transfer on the channel, wherein the queued DARs include priority information;

processing at least one data entry in the queue, the priority information for the data entry, and the priority information for the received DAR to determine a position in the queue for the received DAR;

indicating that the received DAR is at the determined position in the queue; and processing the queue to select retrieved data to transfer on the channel.

2. The method of claim 1, wherein only retrieved data for one DAR can be transferred on the channel at a time.

3. The method of claim 1, wherein the selected retrieved data has priority that is greater than or equal to the priority of other DARs in the queue.

4. The method of claim 1, wherein the memory area is a first memory and wherein a second memory area buffers data from the first memory area, further comprising the steps of:

determining whether the requested data for the received DAR is stored in the second memory area before retrieving the requested data for the received DAR from the first memory area;

retrieving the requested data for the received DAR from the second memory area after determining that the requested data is stored in the second memory area; and transferring on the channel the data retrieved from the second memory area.

5. The method of claim 1, further comprising the step of incrementing the priority of the data entries in the queue having a lower priority than the retrieved data that is indicated at the determined position in the queue.

6. The method of claim 1, wherein the received DAR specifies an address, wherein multiple DARs are capable of being concurrently received and executed against the address.

7. The method of claim 6, wherein the address comprises an alias address associated with a base address, wherein the alias address and the base address access a same location in the memory area, further comprising:

determining whether the determined address is an alias address;

determining the base address associated with the alias address after determining that the determined address is an alias address; and using the base address to retrieve the requested data from the memory area.

8. A method for processing a data access request (DAR), comprising:

receiving a DAR, wherein the data requested for the DAR is to be returned on a channel, wherein multiple DARs can be directed toward the same address;

receiving information indicating a priority of the received DAR;

determining an address in the memory area of the data to retrieve for the received DAR;

processing a queue indicating multiple DARs queued against the determined address, wherein priority information is associated with the queued DARs;

processing at least one DAR entry indicated in the queue, the priority information for the DAR entry, and the priority information for the received DAR to determine a position in the queue for the received DAR;

indicating the received DAR as at the determined position in the queue;

processing the queue to select a DAR; and accessing the memory area to retrieve the requested data for the selected DAR.

9. The method of claim 8, wherein the selected retrieved data has priority that is greater than or equal to the priority of other DARs in the queue.

10. The method of claim 8, wherein data can be concurrently transferred for multiple DARs on the channel.

11. The method of claim 8, wherein the memory area is a first memory, and wherein a second memory area buffers data from the first memory area, further comprising the steps of:

determining whether the requested data for the received DAR is in the second memory area before indicating the received DAR at the determined position in the queue, wherein the step of indicating that the received DAR is at the determined position in the queue occurs after determining that the requested data for the received DAR is not in the second memory area; and retrieving the requested data from the second memory area after determining that data for the received DAR is in the second memory area.

12. The method of claim 8, further comprising the step of incrementing the priority of the data entries in the queue having a lower priority than the retrieved data indicated at the determined position in the queue.

13. The method of claim 8, wherein the queue is a first queue and a second queue includes data entries indicating retrieved data for DARs to transfer on the channel, wherein the queued DARs include priority information, further comprising:

processing at least one data entry in the second queue, the priority information for the data entry, and the priority information for the selected DAR to determine a position in the queue for the selected DAR;

indicating the selected DAR at the determined position in the queue; and processing the queue to select retrieved data to transfer on the channel.

14. A method for processing a data access request (DAR), comprising:

receiving a DAR, wherein the data requested for the DAR is to be returned on a channel, receiving information indicating a priority of the received DAR;

determining an address in the memory area of the data to retrieve for the received DAR wherein the address for the received DAR is an alias address associated with a base address, wherein the alias address and the base address access a same location in the memory area;

determining whether the determined address is an alias address;

determining the base address associated with the alias address after determining that the determined address is an alias address;

processing a queue indicating multiple DARs queued against the determined base address, wherein priority information is associated with the queued DARs;

processing at least one DAR entry indicated in the queue, the priority information for the DAR entry, and the priority information for the received DAR to determine a position in the queue for the received DAR;

indicating the received DAR as at the determined position in the queue;

processing the queue to select a DAR; and accessing the memory area to retrieve the requested data for the selected DAR.

15. The method of claim 8, wherein at least two of the multiple DARs queued against the determined address originate from one host system.

16. A system for processing a data access request (DAR) and for communicating with an input/output (I/O) device and a channel, comprising:

a processing unit;

a memory area accessible to the processing unit, wherein the memory area is capable of storing a data structure indicating an order for DARs to transfer on a channel and priority information for the DARs;

control logic executed by the processing unit, comprising:
(i) means for receiving a DAR, wherein data requested for the DAR is to be returned on the channel;
(ii) means for receiving information indicating a priority of the received DAR;
(iii) means for retrieving requested data for the received DAR from the I/O device;
(iv) means for determining whether the data structure indicates retrieved data for DARs to transfer on the channel;
(v) means for processing at least one DAR entry in the data structure, the priority information for the DAR entry, and the priority information for the received DAR to determine a position in the data structure for the received DAR;
(vi) means for indicating that the received DAR is located at the determined position in the data structure; and
(vii) means for processing the data structure to select retrieved data to transfer on the channel.

17. The system of claim 16, wherein the selected retrieved data has priority that is greater than or equal to the priority of other DARs in the queue.

18. The system of claim 16, further comprising a second memory area that buffers data from the I/O device, wherein the control logic further comprises:

means for determining whether the requested data for the received DAR is stored in the second memory area before retrieving the requested data for the received DAR from the I/O device;

means for retrieving the requested data for the received DAR from the second memory area after determining that the requested data is stored in the second memory area; and means for transferring on the channel the data retrieved from the second memory area.

19. The system of claim 16, wherein the control logic further comprises means for incrementing the priority of the DAR entries indicated in the data structure having a lower priority than the received DAR indicated as located at the determined position in the data structure.

20. The system of claim 16, wherein the I/O device is a logical volume within a direct access storage device (DASD), the processing unit is a storage controller, and the channel provides communication between a host system and the storage controller.

21. The system of claim 16, wherein the received DAR specifies an address, wherein multiple DARs are capable of being concurrently received and executed against the address.

22. The system of claim 21, wherein the address comprises an alias address associated with a base address, wherein the alias address and the base address access a same location in the memory area, wherein the program logic further comprises:
   means for determining whether the determined address is an alias address;
   means for determining the base address associated with the alias address after determining that the determined address is an alias address; and
   means for using the base address to retrieve the requested data from the memory area.

23. The system of claim 16, wherein at least two of the multiple DARs queued against the determined address originate from one host system.

24. A system for processing a data access request (DAR) and for communicating with an input/output (I/O) device and a channel, comprising:
   a processing unit;
   a memory area accessible to the processing unit, wherein the memory area is capable of storing a data structure indicating an ordering of DARs to execute queued against an address and priority information for the DARs;
   control logic executed by the processing unit, comprising:
      (i) means for receiving a DAR, wherein the data requested for the DAR is at the address;
      (ii) means for receiving information indicating a priority of the received DAR;
      (iii) means for determining an address for the I/O device including the data to retrieve for the received DAR;
      (iv) means for determining whether the data structure indicates that multiple DARs are queued against the determined address, wherein priority information is associated with the queued DARs;
      (v) means for processing at least one DAR data entry in the data structure, the priority information for the DAR data entry, and the priority information for the received DAR to determine a position in the data structure for the received DAR;
      (vi) means for indicating that the received DAR is at the determined position in the data structure;
      (v) means for processing the data structure to select a DAR; and
      (vi) means for accessing the I/O device to retrieve the requested data for the selected DAR.

25. The system of claim 24, wherein the selected retrieved data has priority that is greater than or equal to the priority of other DARs indicated in the data structure.

26. The system of claim 24, wherein the control logic further comprises means for concurrently transferring multiple DARs on the channel.

27. The system of claim 24, wherein the memory area is a first memory area, further comprising a second memory area that buffers data from the I/O device, wherein the control logic further comprises:
   means for determining whether the requested data for the received DAR is in the second memory area before adding the received DAR to the data structure; and
   means for retrieving the requested data from the second memory area after determining that data for the received DAR is in the second memory area.

28. The system of claim 24, wherein the control logic further comprises means for incrementing the priority of the DAR entries in the data structure having a lower priority than the DAR of retrieved data added to the queue.

29. The system of claim 24, wherein the data structure is a first data structure and a second data structure indicates retrieved data for DARs to return on the channel, wherein the control logic further comprises:
   means for determining whether the second data structure indicates retrieved data for at least one DAR to transfer on the channel, wherein the queued DARs include priority information;
   means for processing at least one data entry in the second data structure, the priority information for the data entry, and the priority information for the selected DAR to determine a position in the second data structure for the selected DAR;
   means for indicating in the second data structure the selected DAR at the determined position in the data structure; and
   means for processing the second data structure to select retrieved data to transfer on the channel.

30. The system of claim 24, wherein the I/O device is a direct access storage device (DASD), wherein the processing unit is a storage controller, wherein the channel provides communication between a host system and the storage controller, and wherein the address accesses a logical volume in the DASD.

31. A system for processing a data access request (DAR) and for communicating with an input/output (I/O) device and a channel, comprising:
   a processing unit;
   a memory area accessible to the processing unit, wherein the memory area is capable of storing a data structure indicating an ordering of DARs to execute queued against an address and priority information for the DARs;
   control logic executed by the processing unit, comprising:
      (i) means for receiving a DAR, wherein the data requested for the DAR is at the address;
      (ii) means for receiving information indicating a priority of the received DAR;
      (iii) means for determining an address for the I/O device including the data to retrieve for the received DAR wherein the address for the received DAR is an alias address associated with a base address, wherein the alias address and the base address access a same location in the memory area;
      (iv) means for determining whether the determined address is an alias address;

(v) means for determining the base address associated with the alias address after determining that the determined address is an alias address;
(vi) means for determining whether the data structure indicates that multiple DARs are queued against the determined address wherein priority information is associated with the queued DARs;
(vii) means for processing at least one DAR data entry in the data structure, the priority information for the DAR data entry and the priority information for the received DAR to determine a position in the data structure for the received DAR,
(viii) means for indicating that the received DAR is at the determined position in the data structure;
(ix) means for processing the data structure to select a DAR; and
(x) means for accessing the I/O device to retrieve the requested data for the selected DAR.

* * * * *

UNITED STATES PATENT AND TRADEMARK OFFICE
CERTIFICATE OF CORRECTION

PATENT NO.   : 6,253,260 B1
DATED        : June 26, 2001
INVENTOR(S)  : Brent Cameron Beardsley, James Lincoln Iskiyan and Harry Morris Yudenfriend It is certified that error appears in the above-identified patent and that said Letters Patent is hereby corrected as shown below:

Column 13,
Line 54, delete the comma and insert a semicolon after "channel"
Line 54, start a new paragraph after "channel" and before "receiving"

Signed and Sealed this

Sixth Day of July, 2004

JON W. DUDAS
*Acting Director of the United States Patent and Trademark Office*